US009463424B2

(12) United States Patent
Kanstad et al.

(10) Patent No.: US 9,463,424 B2
(45) Date of Patent: Oct. 11, 2016

(54) ACTUATABLE FLOW CONDITIONING APPARATUS

(71) Applicant: ONESUBSEA IP UK LIMITED, London (GB)

(72) Inventors: Stig Kaare Kanstad, Bergen (NO); Nils Egil Kangas, Bergen (NO)

(73) Assignee: ONESUBSEA IP UK LIMITED, London (GB)

( * ) Notice: Subject to any disclaimer, the term of this patent is extended or adjusted under 35 U.S.C. 154(b) by 0 days.

(21) Appl. No.: 14/327,214

(22) Filed: Jul. 9, 2014

(65) Prior Publication Data

US 2016/0010433 A1 Jan. 14, 2016

(51) Int. Cl.

| | |
|---|---|
| ***E21B 43/26*** | (2006.01) |
| ***B01F 5/06*** | (2006.01) |
| ***B01D 3/14*** | (2006.01) |
| ***B01D 47/10*** | (2006.01) |
| ***B01F 3/04*** | (2006.01) |
| ***B01F 15/00*** | (2006.01) |

(52) U.S. Cl.

CPC ....... *B01F 3/04985* (2013.01); *B01F 3/04503* (2013.01); *B01F 5/0689* (2013.01); *B01F 15/00032* (2013.01)

(58) Field of Classification Search

None

See application file for complete search history.

(56) References Cited

U.S. PATENT DOCUMENTS

| | | | | |
|---|---|---|---|---|
| 5,135,684 | A | 8/1992 | Mohn et al. | |
| 6,280,505 | B1 * | 8/2001 | Torkildsen ......... | B01D 53/1456 261/DIG. 54 |
| 6,284,023 | B1 | 9/2001 | Torkildsen et al. | |
| 6,284,024 | B1 | 9/2001 | Torkildsen et al. | |
| 6,699,308 | B1 | 3/2004 | Nilsen et al. | |
| 7,018,451 | B1 | 3/2006 | Torkildsen et al. | |
| 2014/0223894 | A1 * | 8/2014 | Tomter et al. .................. | 60/327 |
| 2015/0092513 | A1 * | 4/2015 | Folkner ................. | B01F 5/0426 366/340 |

FOREIGN PATENT DOCUMENTS

| | | | |
|---|---|---|---|
| EP | 0379319 | A2 | 7/1990 |
| EP | 2425890 | A1 | 3/2012 |

* cited by examiner

*Primary Examiner* — Matthew R Buck
*Assistant Examiner* — Douglas S Wood
(74) *Attorney, Agent, or Firm* — Conley Rose, P.C.

(57) ABSTRACT

An actuatable apparatus, such as a mixer or flow splitter, is described that forms part of a multiphase pumping station. An outer tank has an upper inlet and an actuatable inner vessel disposed within the outer vessel. Multiphase fluid can pass from the outer vessel into the inner vessel though large upper openings. The inner vessel is configured to be actuatable such that the inner vessel moves in a vertical direction, thereby altering the size of an annular opening between the bottom of the inner vessel and the outer vessel. In some cases, the annular opening is adjusted to alter the operating envelope of a mixer. In other cases, the annular opening is opened to allow for sand cleaning. In yet other cases the apparatus is a downstream flow splitter, and the annulus is shut off to prevent loss of liquid phase during the startup of a dead field.

19 Claims, 7 Drawing Sheets

ACTUATABLE FLOW CONDITIONING APPARATUS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

1. Field of the Invention

The present disclosure relates to fluid conditioning systems. More particularly, the present disclosure relates to systems for conditioning multiphase fluids, such as mixing and/or splitting such fluids in connection with a subsea and/or topside multiphase pumping system.

2. Background of the Technology

In fluid processing systems, such as multiphase pumping stations, a multiphase pump can be combined with an upstream multiphase mixer and downstream flow splitter. The multiphase mixer utilizes a large volume tank and it is advantageous to design the mixer for long-term installation on the sea floor. Because the multiphase mixer is often intended to be deployed for long periods of time, up to the lifetime of the field, it should be designed to deal with a relatively wide operating envelope in terms of both flow rate and gas volume fraction (GVF). However, the larger the operating envelope, the greater the compromise in mixer performance. For example, the mixer may be designed larger than ordinary in order to handle hydrodynamic slugging, while at the same time the annulus clearance may be designed smaller in order to push the operating envelope up toward higher GVF levels.

Another challenge to multiphase mixers that are designed for long-term deployment is the accumulation of sand and other solid debris. Recent findings show that in some fields, accumulations of sand and solid debris are possible within the volume of multiphase subsea upstream mixers. Additionally, because the differential pressure across the liquid flow path in the mixer and splitter is substantially less than the pressure differences across the pump, it is easier to block a mixer compared to a pump, assuming the same size of clearance.

Yet another challenge in multiphase pumping stations is starting up a dead field. The pumping station might be designed such that the flow splitter is self-draining into the bypass header, which in turn is self draining into the flow line. There is hence a risk, when starting up a dead field where there are no free flowing wells. In such cases, the pump station can be quickly emptied of liquid if there is some amount of gas in the flow line upstream of the pump station. No or limited amounts of liquid inside the station will reduce the available draw down and hence limit the ability to start a dead field.

BRIEF SUMMARY OF THE DISCLOSURE

This summary is provided to introduce a selection of concepts that are further described below in the detailed description. This summary is not intended to identify key or essential features of the claimed subject matter, nor is it intended to be used as an aid in limiting the scope of the claimed subject matter.

According to some embodiments, an actuatable apparatus is described for receiving a multiphase fluid from a source thereof and for conditioning the multiphase fluid (e.g. mixing the fluid and/or splitting the fluid flow). The apparatus includes: an outer vessel configured to condition the multiphase fluid; an upper inlet configured to receive the multiphase fluid from a source and introduce the multiphase fluid at an upper location into the outer vessel; an actuatable inner vessel disposed within the outer vessel comprising one or more upper openings at an upper location of the inner vessel such that multiphase fluid can pass from the outer vessel into the inner vessel. The inner vessel has a lower opening at a lower location of the inner vessel such that multiphase fluid can pass out of the inner vessel. The inner vessel is configured to be actuatable such that the inner vessel moves in a vertical direction with respect to the outer vessel. The apparatus also includes a lower outlet configured to discharge the conditioned multiphase fluid from the outer vessel. The lower outlet is in fluid communication with the lower opening of the inner vessel such that multiphase fluid passing out of the inner vessel is discharged from the outer vessel.

According to some embodiments, the apparatus is a mixer and is configured to be deployed upstream of a multiphase pump or any equipment that benefits from reduced slugging (e.g. compressors, multiphase flow meters, centrifugal separators, etc.). According to some embodiments, a lower annulus is formed between an outer lower portion of the inner vessel and an inner lower portion of the outer vessel. Actuating the inner vessel in the vertical direction can alter the size of the lower annulus, thereby altering an operating envelope of the apparatus. According to some embodiments, actuating the inner vessel upward facilitates cleaning of solid debris collected in the outer vessel for example by flushing into a dummy pump module.

According to some embodiments, the apparatus is a flow splitter positioned downstream of an outlet of a multiphase pump or wet gas compressor, etc. The apparatus can include a liquid-rich outlet from the outer vessel configured to draw liquid-rich flow from the multiphase fluid and to recirculate the liquid rich flow back into the multiphase pump. The lower annulus formed between inner vessel and a wall of the outer vessel can be reduced in size by actuation of the inner vessel, thereby increasing ability to draw liquid-rich fluid from the liquid-rich outlet.

According to some embodiments, a method of conditioning a multiphase fluid is described. The method includes: introducing the multiphase fluid from a source into an upper inlet of an outer vessel; flowing at least a portion of the multiphase fluid into an actuatable inner vessel disposed within the outer vessel through one or more upper openings at an upper location of the inner vessel; flowing at least a portion of the multiphase fluid through the inner vessel, outward through a lower opening of the inner vessel, and outward through a lower outlet of the outer vessel; and flowing a second portion of the multiphase fluid from the outer vessel through a lower annulus formed between an outer lower portion of the inner vessel and an inner lower portion of the outer vessel, and outward through the lower outlet of the outer vessel, thereby bypassing the inner vessel. According to some embodiments, the inner vessel is actuated in a vertical direction with respect to the outer vessel, thereby altering a size of the lower annulus. By actuating the inner vessel in an upward direction, the lower annulus is enlarged and solid debris collected in the outer vessel can be flushed outward through the annulus and outward through the lower outlet. According to some embodiments, the inner vessel is removed from the outer vessel, and accumulated solid debris is flushed from the outer vessel using an external fluid source. According to some embodiments, actuating the inner vessel in the vertical direction alters the size of the lower annulus, thereby altering an operating envelope of the mixing.

According to some embodiments, the multiphase fluid is split into a first flow path leading toward a surface location (or toward another downstream flow line) and a second liquid-rich flow path recirculating back into an upstream pump. Actuating the inner vessel in a vertical direction with respect to the outer vessel can close the lower annulus and cause most or all of the liquid phase to recirculate back into the upstream pump. Flow from one or more wells that had been previously non-producing can thus be initiated. When one or more of the wells are producing sufficient liquid phase, the inner vessel can be re-actuated, thereby re-opening the lower annulus.

According to some embodiments, a method is described for starting up one or more dead wells using a multiphase pumping station. The method includes: in a subsea location, pumping a multiphase fluid with a subsea multiphase pump; introducing the pumped multiphase fluid into a flow splitter disposed downstream of the pump. The flow splitter includes an upper gas-rich outlet, a lower liquid rich outlet, and a main outlet. A first valve is closed, thereby shutting off the main outlet of the splitter. A second valve is opened, thereby allowing gas-rich fluid from the upper gas-rich outlet of the splitter to flow out of the pumping station. A third valve is opened, thereby allowing liquid-rich fluid from the lower liquid-rich outlet of the splitter to flow back into the pump. After sufficient liquid phase is being drawn from one or more previously non-producing wells into the pump, the first valve is opened and the the second valve is closed.

According to some embodiments, one or more of the described systems and/or methods can be used in topside or subsea fluid processing equipment in an analogous fashion.

BRIEF DESCRIPTION OF THE DRAWINGS

The subject disclosure is further described in the detailed description, which follows, in reference to the noted plurality of drawings by way of non-limiting examples of embodiments of the subject disclosure, in which like reference numerals represent similar parts throughout the several views of the drawings, and wherein.

DETAILED DESCRIPTION OF THE PREFERRED EMBODIMENTS

The particulars shown herein are by way of example, and for purposes of illustrative discussion of the embodiments of the subject disclosure only, and are presented in the cause of providing what is believed to be the most useful and readily understood description of the principles and conceptual aspects of the subject disclosure. In this regard, no attempt is made to show structural details of the subject disclosure in more detail than is necessary for the fundamental understanding of the subject disclosure, the description taken with the drawings making apparent to those skilled in the art how the several forms of the subject disclosure may be embodied in practice. Further, like reference numbers and designations in the various drawings indicate like elements.

Figure 1:
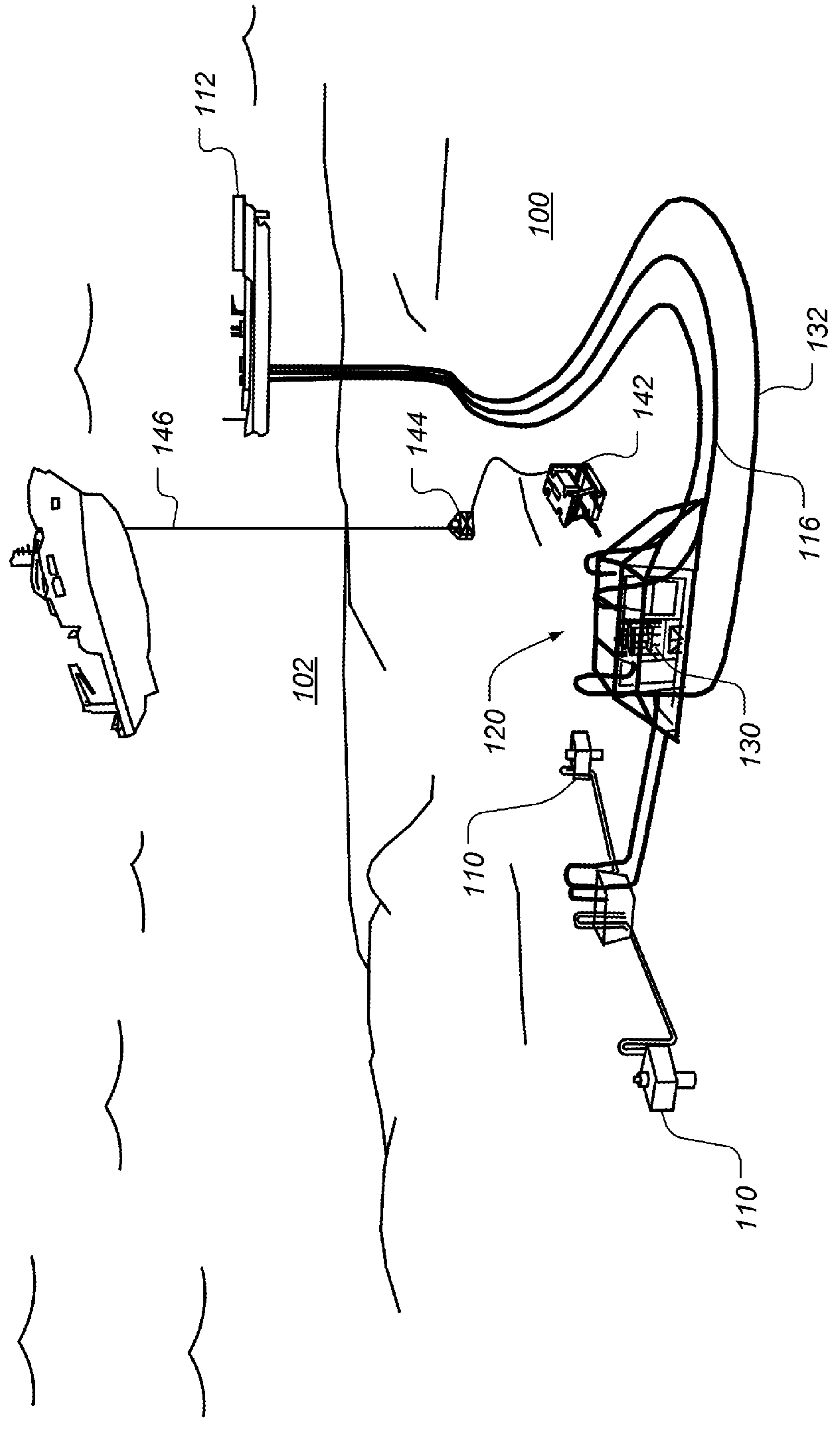
FIG. 1 is a diagram illustrating a subsea environment in which a multiphase fluid processing system may be deployed, according to some embodiments.

FIG. 1 is an example diagram illustrating a subsea environment in which a multiphase fluid processing system is deployed, according to some embodiments. On sea floor 100, a station 120 is that which is downstream of several wellheads 110 being used, for example, to produce hydrocarbon-bearing fluid from a subterranean rock formation. Station 120 includes a subsea multiphase pump 130. The station 120 is connected to one or more umbilical cables, such as umbilical 132. The umbilicals in this case are being run from a floating production, storage and offloading unit (FPSO) 112 through seawater 102, along sea floor 100 and to station 120. In other cases, the umbilicals may be run from some other surface facility such as a platform, or a shore-based facility. In addition to pump 130, the station 120 can include various other types of subsea equipment. The umbilical 132 is used to supply barrier fluid for use in the subsea pump or compressor. Umbilical 132 also provides electrical power to station 120, and often also include lines for control fluid in order to operate actuated valves, as well as lines for various chemicals (e.g. for wax-, scale, corrosion inhibitors etc.). Also visible in FIG. 1 is ROV 142, tethered using main lift umbilical 146 and tether management system 144.

Figure 2:
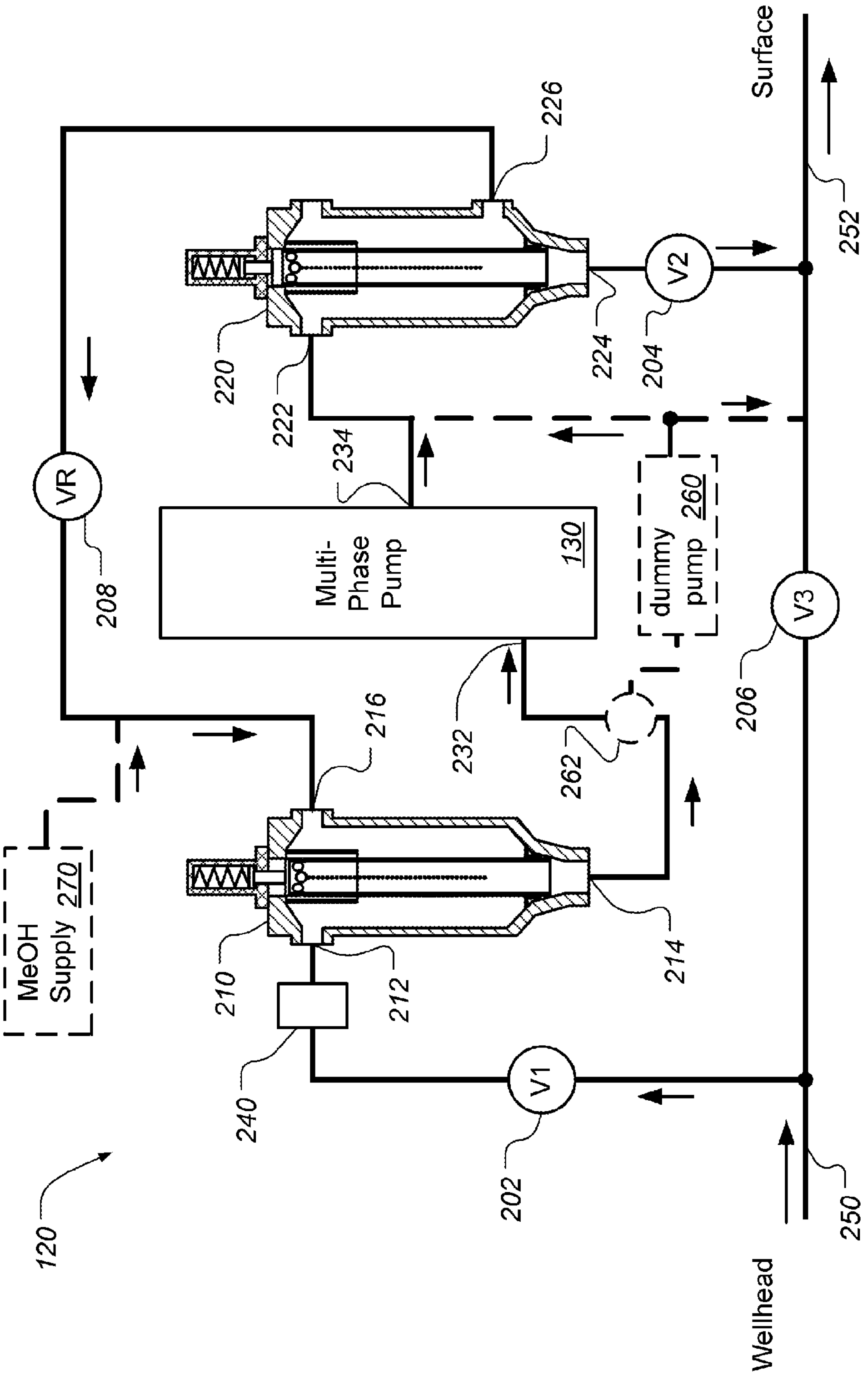
FIG. 2 is a diagram illustrating some aspects of a multiphase pumping station, according to some embodiments.

FIG. 2 is a diagram illustrating some aspects of a multiphase pumping station, according to some embodiments. In this simplified diagram, pumping station 120 is shown with multiphase pump 130. Multiphase fluid from wells enters from flow line 250. In the case where valves 202 (V1), 204 (V2) and 208 (VR) are open and bypass valve 206 (V3) is closed, the multiphase fluid flows first into mixer 210. Multiphase fluid enters mixer 210 via mixer inlet 212. The mixer, which will be described in further detail, infra, mixes the multiphase fluid to form a more homogeneous mixture of liquid and gas phases. The homogenized multiphase fluid mixture exits the mixer 210 via mixer outlet 214 and enters the suction port 232 of pump 130. The multiphase fluid exits the pump 130 via port 234 and the fluid enters splitter 220 via splitter inlet 222. Splitter 220 splits the flow. In normal operation, most of the flow exits splitter 220 via main outlet 224 while a small fraction (or none, if desired) of fluid-rich flow exits splitter 220 via fluid-rich outlet 226. The fluid from the main outlet 224 flows through valve 204 and toward the surface via flowline 252. The fluid exiting the fluid-rich port 226 recirculates back through valve 208 and back into mixer 210 via inlet 216. According to some embodiments, the fluid exiting port 226 and through valve 208 is routed back to another location upstream of mixer 210 and/or to multiphase pump 130. According to some embodiments, valve 208 can be closed when recirculation is not desired. According to some embodiments, an inlet strainer 240 can be included upstream of mixer 210. In some embodiments, the inlet strainer 240 includes a back flush system (not shown) configured to push debris into, for example, a bypass header and further toward the topside so as to alleviate clogging issues.

Figure 3A:
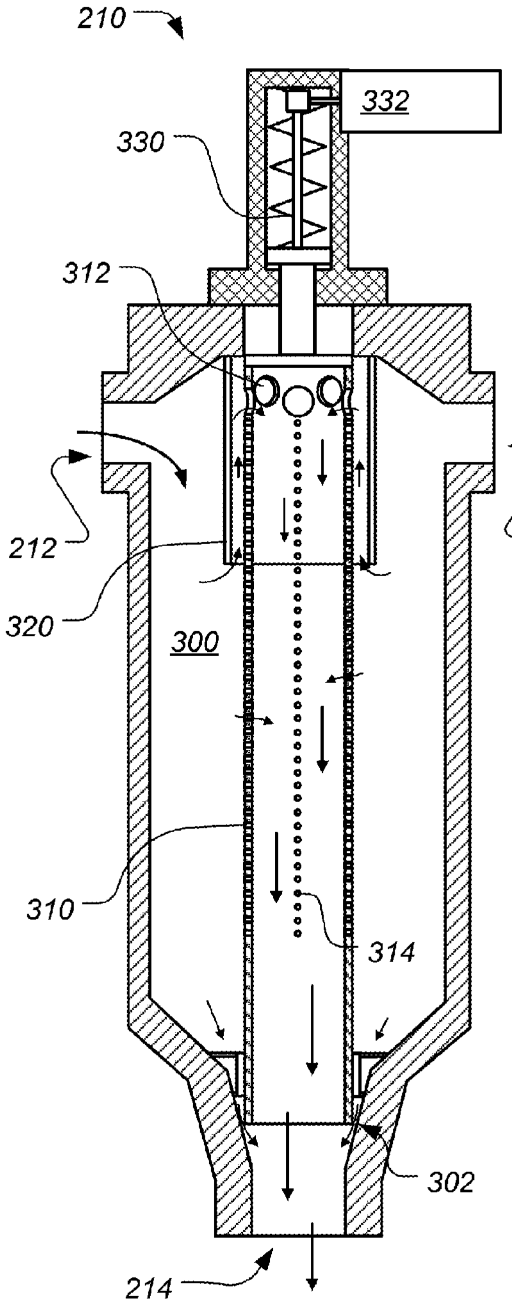
FIGS. 3A and 3B are cross sections illustrating further detail of a multiphase mixer having an adjustable operating envelope, according to some embodiments.
Figure 3B:
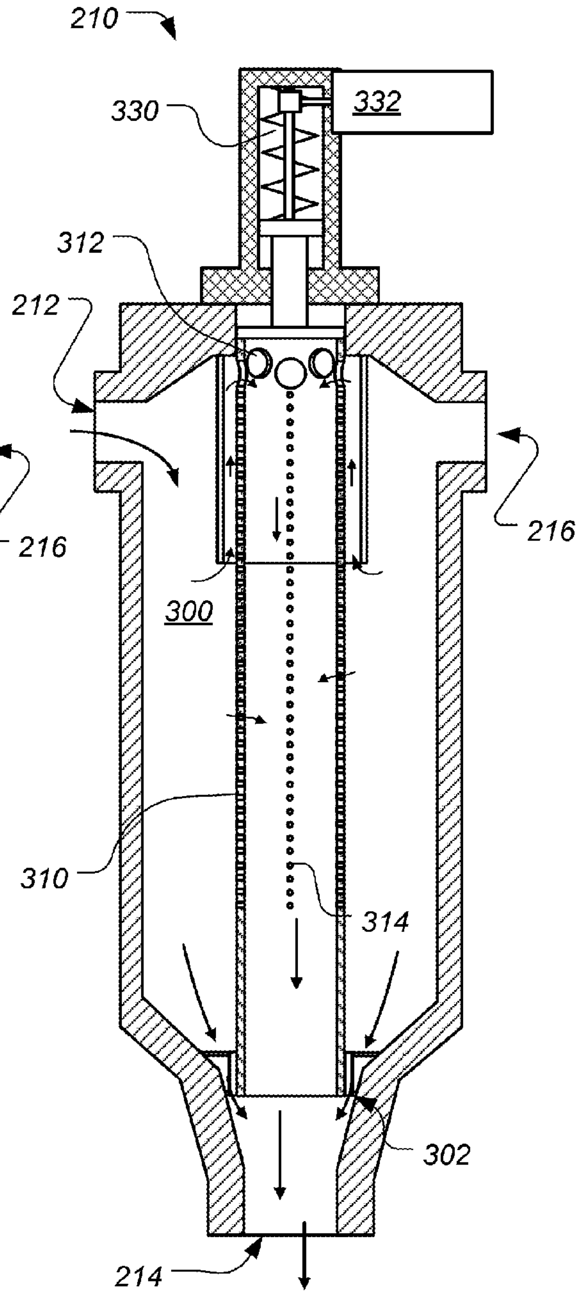

FIGS. 3A and 3B are cross sections illustrating further detail of a multiphase mixer having an adjustable operating envelope, according to some embodiments. The mixer 210 has an extended operating range both in terms of flow rate and gas volume fraction (GVF). This might be desirable, for example, with subsea components such as subsea mixers, which are installed for long periods of time and therefore may be expected to perform during changes occurring during the field's lifetime.

Multiphase fluid enters from mixer inlet 212 into the large volume 300 of the main mixer tank. Two main fluid paths exist from volume 300 to outlet 214. First fluid can pass into central pipe 310 either through upper openings 312 or through smaller holes 314 along the side wall of pipe 310. Fluid in pipe 310 flows downward and out through the outlet 214. Fluid enters central pipe through a relatively circuitous path—upward along the inside of sleeve 320 or through the plurality of small holes 314. A second fluid path exits through an annular opening 302 between the lower edge of pipe 310 and the tapered inner wall of mixer housing. For further details of operation and/or variations in design for mixer 210, according to some embodiments, please see e.g. European patent application nos. EP0379319A2, EP2425890A1, and U.S. Pat. Nos. 5,135,684; 6,280,505; 6,284,023; 6,284,024; 6,699,308; and 7,018,451, each of which is hereby incorporated by reference herein.

The central pipe 310 is equipped with an actuator 332 that can be used to lower or raise the central pipe 310, hence changing the cross sectional area of annular opening 302. Note that although actuation of central pipe is shown and described as using an "actuator," according to some embodiments, other forms of actuation can be used, such as an ROV turning a handle, or by remote operation in a similar fashion as is known with remote valve operation. Changing the area of annular opening 302 in turn changes the size of the liquid flow path through opening 302 and hence changes the operating envelope of the mixer. In general, operating at higher GVF values uses a smaller annular opening 302. Increasing the flow rate will shift the operating envelope toward a higher GVF, while decreasing the flow will shift the operating envelope toward a lower GVF.

Figure 4A:
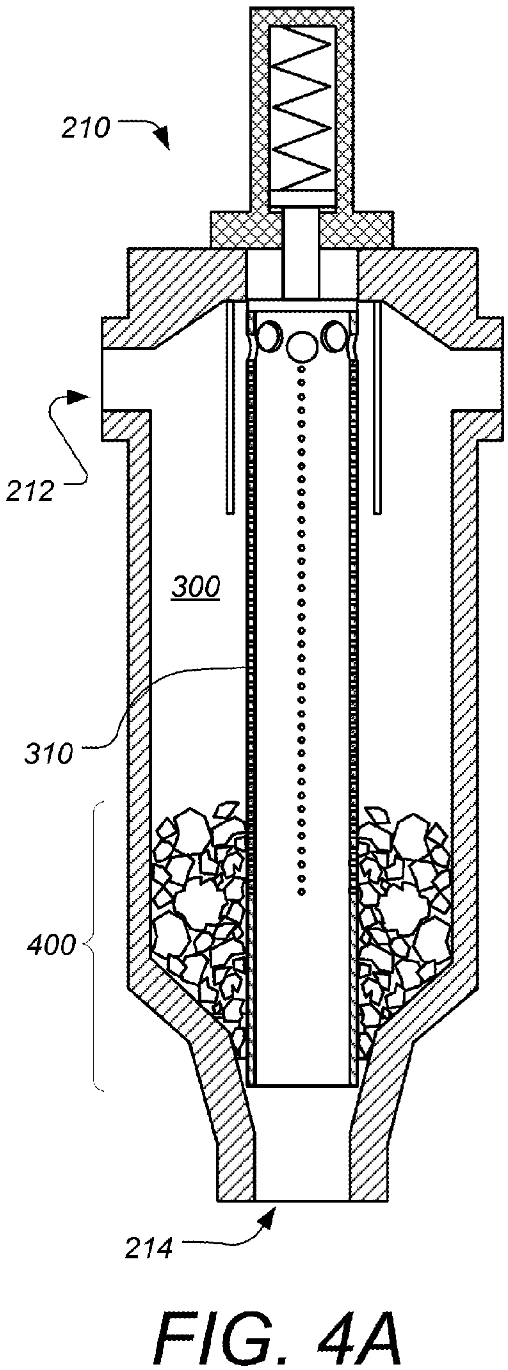
FIGS. 4A and 4B show aspects of a technique for cleaning accumulated debris from a multiphase mixer, according to some embodiments.
Figure 4B:
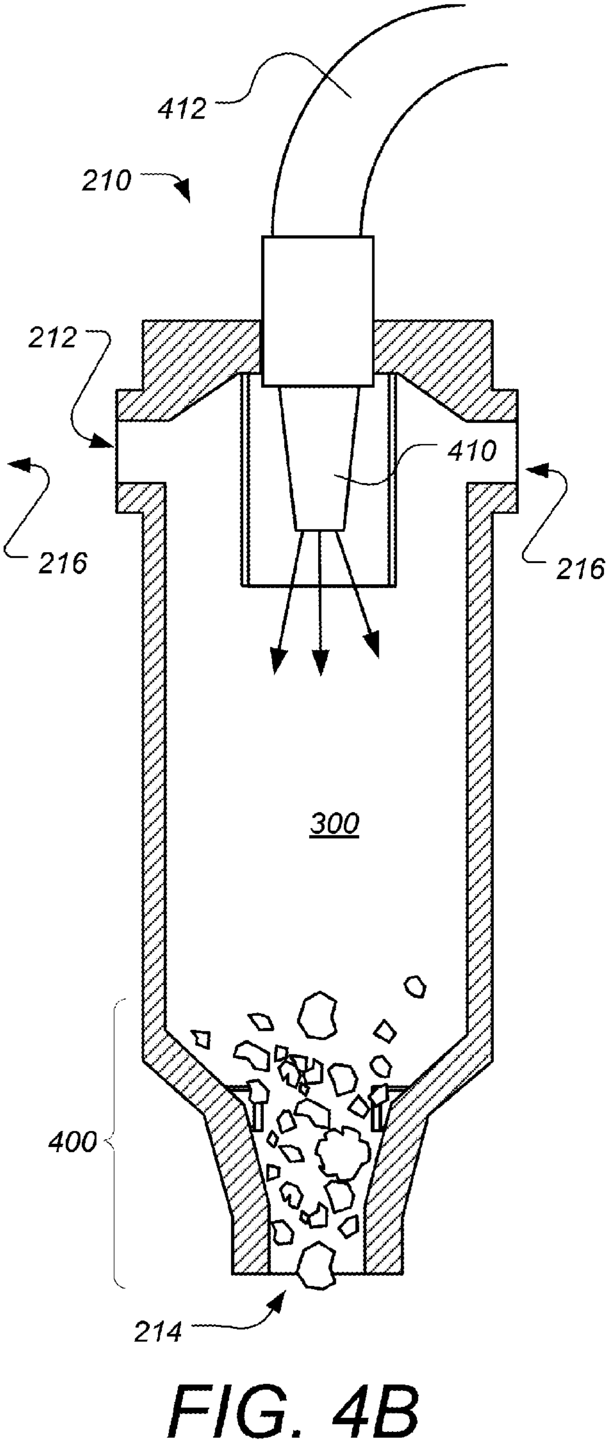

According to some embodiments, further details of cleaning accumulated debris from multiphase mixers will now be provided. Over time, it has been found that multiphase mixers, such as mixer 210, that are upstream of a multiphase pump can accumulate debris such as sand, gravel and other solid matter. FIGS. 4A and 4B show aspects of a technique for cleaning accumulated debris from a multiphase mixer, according to some embodiments. FIG. 4A shows mixer 210 in which volume 300 is partially filled with accumulated debris 400. According to the design shown in FIGS. 4A and 4B, the central pipe 310 is removable. In particular, the central pipe 310 can be removed by opening a clamp connector. An ROV (such as ROV 142 shown in FIG. 1) with a pumping skid can then be used to jet the debris 400 out of the mixer 210. In FIG. 4B, a jet nozzle 410 is shown inserted into the central pipe opening and is being used to clean out debris 400 from volume 300 of mixer 210. The jet nozzle 410 is being fed pressurized liquid via hose 412 from a pumping skid attached to an ROV. Note that ROV is also used to divert fluid and debris passing through the outlet 214 to be gathered downstream, for example, by a dummy pump that forms part of the pumping system, or is installed by the ROV. An example of a dummy pump 260 is shown in FIG. 2 and discussed in more detail, infra. According to some embodiments, the debris is simply pushed directly into the flowline 252.

Figure 5A:
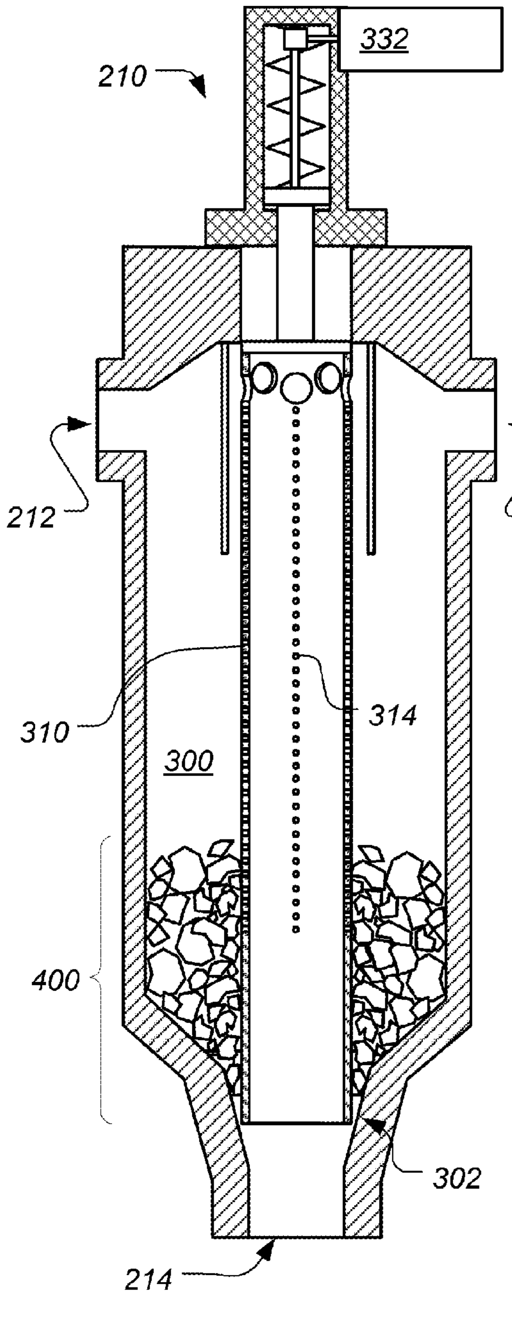
FIGS. 5A and 5B show aspects of a technique for cleaning accumulated debris from a mixer according so some other embodiments.
Figure 5B:
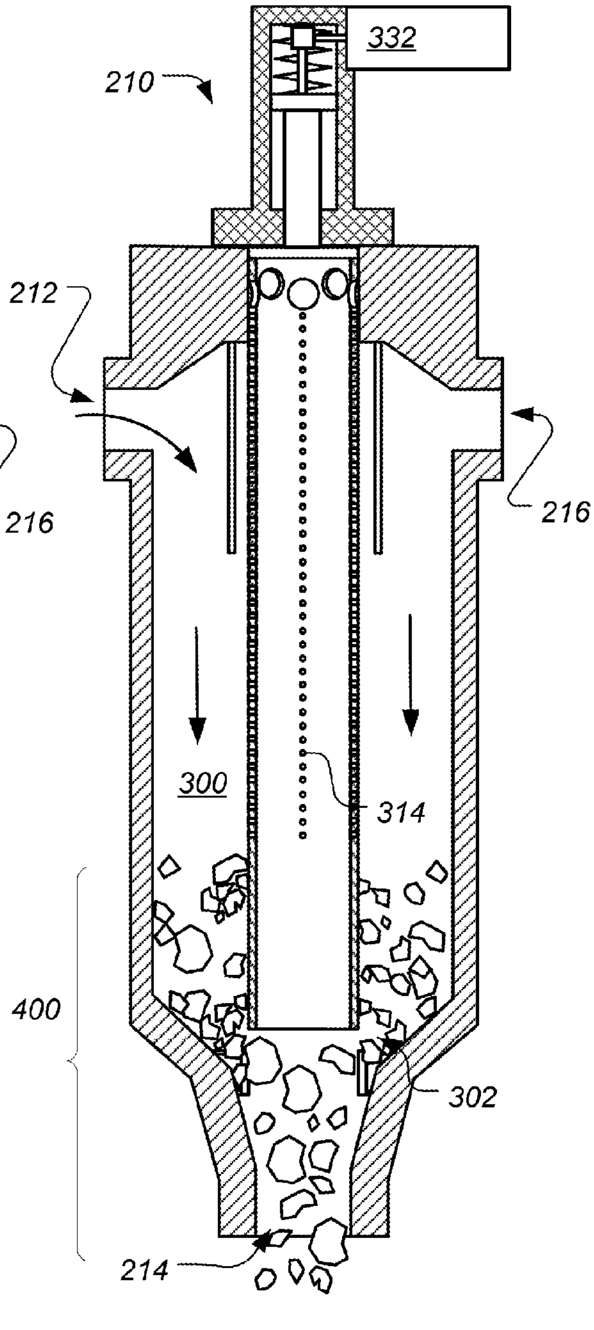

FIGS. 5A and 5B show aspects of a technique for cleaning accumulated debris from a mixer according so some other embodiments. In this case, the position of the central pipe 310 can be adjusted by either an ROV override or by activating actuator 332. The central pipe can be moved to an upper position where the inlet of the central pipe (large holes 312) is blocked, hence routing the total flow through the liquid path (annulus 302), thus using the production flow to wash out the sand.

As in the case of FIGS. 4A and 4B, the sand/debris cleaning is combined with a dummy pump in order to avoid producing large amounts of sand through the downstream multiphase pump 130 (shown n FIG. 2). A dummy pump 260 (shown in FIG. 2) could also be designed as a sand trap if it is desirable to avoid pushing the sand into the flow line. According to some embodiments, dummy pump 260 is a spool piece connected to the inlet and outlet flanges where another pump could ordinarily be installed. The sand can be flushed out through the dummy pump 260 into the flow line 252 directly or it could be designed as a "container" in order to collect the sand/debris removed from the mixer 210. According to some embodiments, the dummy pump 260 is positioned in parallel with pump 130, and valves (e.g. valve 262) are used to route debris into the dummy pump 260 instead of through the pump 130.

According to some embodiments, a differential pressure across an inlet strainer, if installed (e.g. see strainer 240 in FIG. 2), can indicate if the wells are producing large amounts of sand/solids without damaging the pump station. The inlet strainer 240 can also give a clear indication to the operator of what problem is occurring, in such cases.

According to some embodiments, the small holes 314 in central pipe 310 can be configured differently in order to reduce sand collecting within mixer 210. In one example, instead of 4 columns of small holes 314 such as shown in the figures, each perforated section of the central pipe 310 of the mixer 210 has one or two larger diameter holes. By having a fewer number of larger holes, the sand collecting ability of mixer 210 is reduced. In order to maintain symmetry, the pattern of holes can be staggered in a spiral pattern along the length of central pipe 310. In general, enlarging the diameter of holes 314 will allow more sand to be produced through the central pipe 310, which will reduce collection of sand that fills the mixer. The diameter of the holes 314, according to some embodiments, should be larger than the radial clearance of the annulus 302. One reason for increasing the diameter and reducing the number of holes 314 may be to reduce clogging of the holes (e.g. from wax, sand, asphaltenes, and/or scale) as clogging may decrease the operating envelope of the mixer.

Figure 6A:
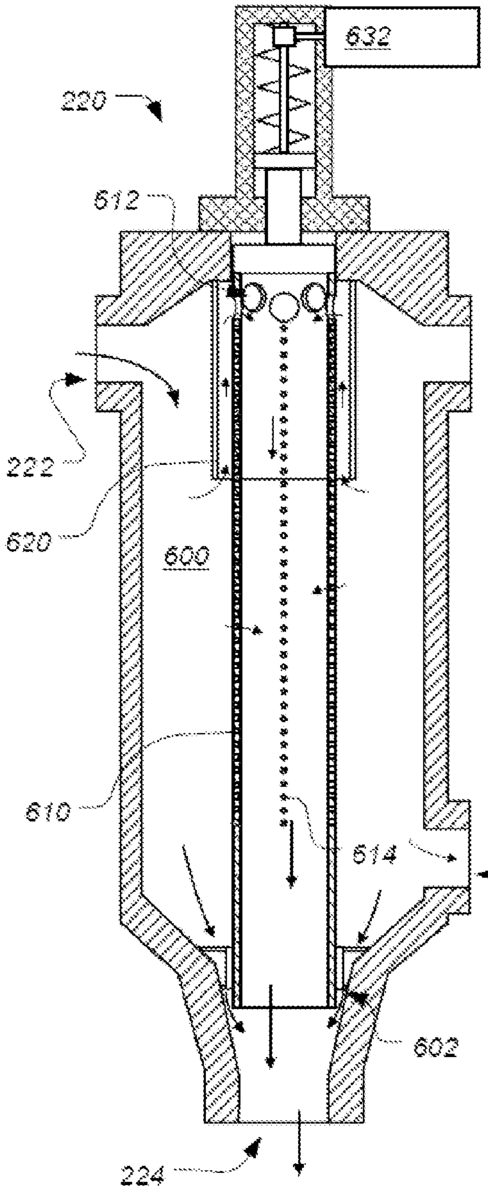
FIGS. 6A and 6B are cross sections showing a flow splitter having an adjustable central pipe, according to some embodiments.
Figure 6B:
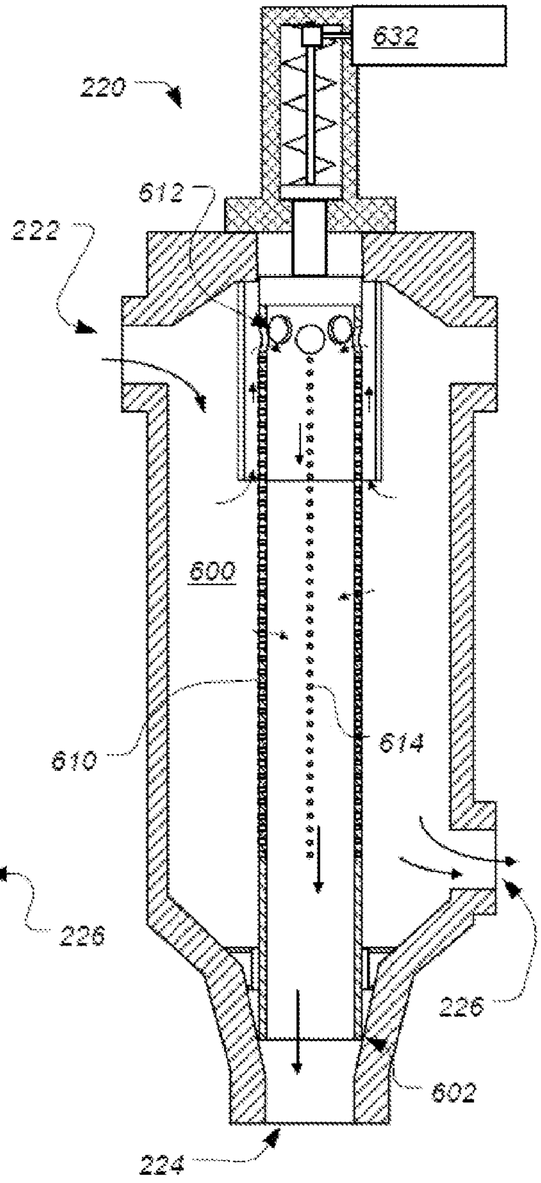

Further details of a downstream splitter will now be provided, according to some embodiments. FIGS. 6A and 6B are cross sections showing a flow splitter having an adjustable central pipe, according to some embodiments. Multiphase fluid enters flow splitter 220 from inlet 222 into the large volume 600 of the main splitter tank. Two main fluid paths exits from volume 600 to outlet 224. First fluid can pass into central pipe 610 either through large upper openings 612 or through small holes 614 along the sidewall of pipe 610. Fluid in pipe 610 flows downward and out through the outlet 224. Fluid enters central pipe 610 through a relatively circuitous path—upward along the inside of sleeve 620 or through the plurality of small holes 614. A second fluid path exits through an annular opening 602 between the lower edge of pipe 610 and the tapered inner wall of splitter 220 housing.

According to some embodiments, the flow splitter 220 located downstream of the pump is equipped with an adjustable central pipe 610 that can be used to close the annular opening 602. According to some embodiments, actuator 632 is used to move central pipe 610 in a vertical direction. The liquid content inside the station 120 can be maintained and even increased by injecting, for instance, MeOH (via optional MeOH supply 270 shown in FIG. 2) while gas from upstream of the station 120 is allowed to escape to downstream of the station through the central pipe 610 via outlet 224. Note that although MeOH supply 270 is shown feeding into inlet 216 of mixer 210, according to some embodiments, several injection points can be provided, and any injection point located such that the liquid goes through the pump 130 can be used. The capability of shutting off the liquid-rich path in flow splitter 220 allows for the retention of liquid in pump station 120 while gas is still produced. This might be useful in starting up a dead field, because in such cases, there is a risk of producing most or all of the available liquid in station 120 very quickly, which reduces the draw down of pump 130. Once the wells are started, the central pipe 610 is raised up again such that liquid can be produced normally.

Figure 7:
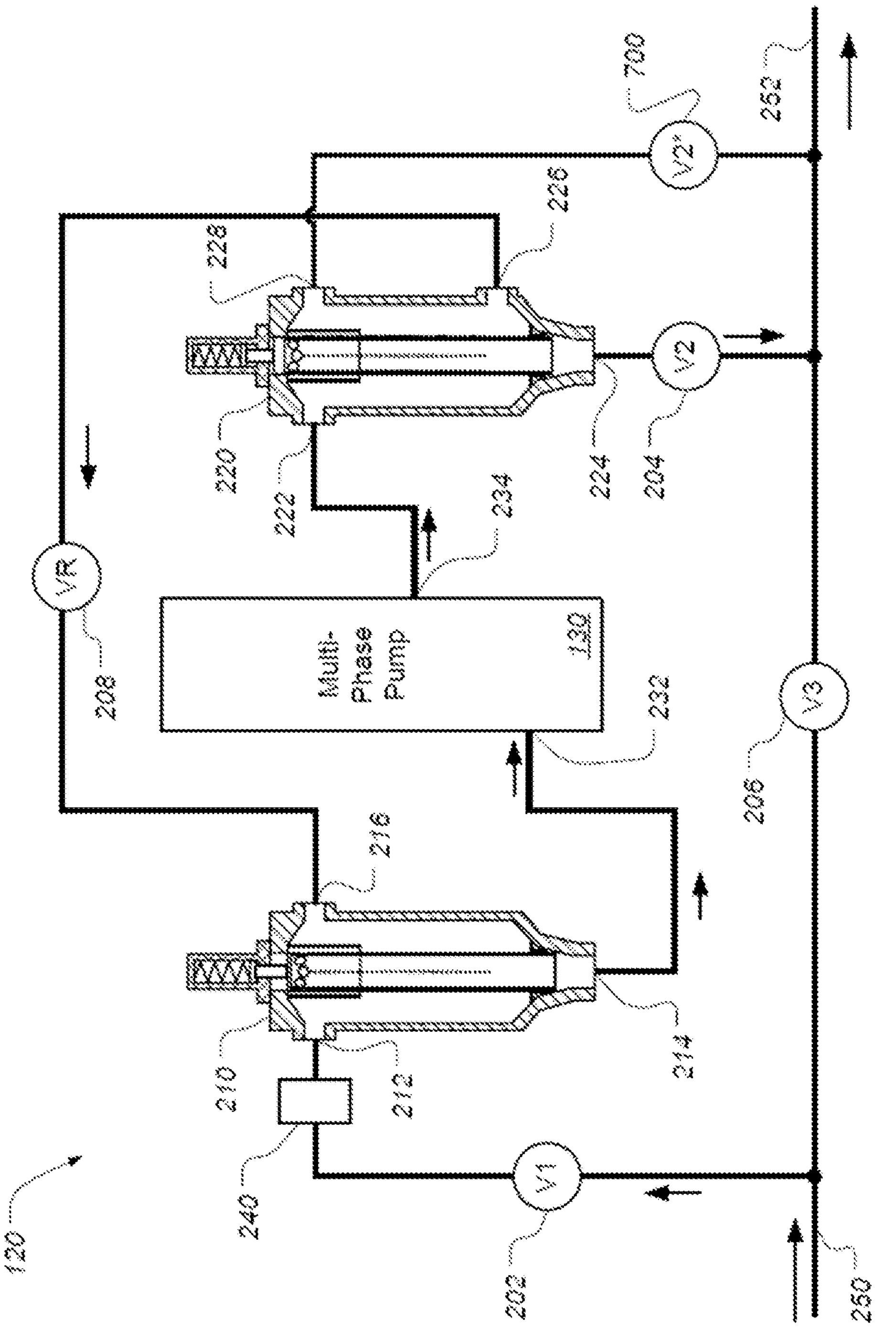
FIG. 7 is a diagram illustrating some aspects of a multiphase pumping station, according to some other embodiments.

FIG. 7 is a diagram illustrating some aspects of a multiphase pumping station, according to some other embodiments. In this simplified diagram, similar in many ways to FIG. 2, supra, pumping station 120 is shown with multiphase pump 130, upstream mixer 210 and downstream flow splitter 220. However, using the additional flow path and valve 700 (V2*) a similar functionality can be accomplished for retaining liquid while expelling gas as was described with respect to FIGS. 6A and 6B, supra. By closing valve 204 (V2) and having a second outlet pipe and isolation valve 700 (V2*) from upper outlet 228 of the flow splitter 220, a gas-rich exit flow path is created that bypasses valve 204 (V2). The gas from upstream the station will in this case be produced through the bypass valve 700 (V2*) until the wells are started. Valve 204 (V2) is then opened and valve 700 (V2*) closed.

While the subject disclosure is described through the above embodiments, it will be understood by those of ordinary skill in the art that modification to and variation of the illustrated embodiments may be made without departing from the inventive concepts herein disclosed. Moreover, while some embodiments are described in connection with various illustrative structures, one skilled in the art will recognize that the system may be embodied using a variety of specific structures. Accordingly, the subject disclosure should not be viewed as limited except by the scope and spirit of the appended claims.

What is claimed is:

1. An actuatable apparatus for receiving a multiphase fluid from a source thereof and for conditioning said multiphase fluid, the fluid comprising a gaseous phase and a liquid phase, the apparatus comprising:

an outer vessel configured to condition the multiphase fluid;

an upper inlet configured to receive the multiphase fluid from the source and introduce said multiphase fluid at an upper location into the outer vessel;

an actuatable inner vessel disposed within the outer vessel comprising one or more upper openings at an upper location of the inner vessel such that multiphase fluid can pass from the outer vessel into the inner vessel, the inner vessel having a lower opening at a lower location of the inner vessel such that multiphase fluid can pass out of the inner vessel, the inner vessel being configured to be actuatable such that the inner vessel moves in a vertical direction with respect to the outer vessel;

a sleeve disposed within the outer vessel that receives at least a portion of the actuatable inner vessel therein, wherein the one or more upper openings are disposed within the sleeve; and a lower outlet configured to discharge the conditioned multiphase fluid from the outer vessel, the lower outlet in fluid communication with the lower opening of the inner vessel such that multiphase fluid passing out of the inner vessel is discharged from the outer vessel.

2. An apparatus according to claim 1, wherein the outer vessel is configured to mix said gaseous phase and liquid phase such that the conditioned multiphase fluid is in a homogenized state.

3. An apparatus according to claim 2, wherein said inner vessel further comprises a plurality of perforations along side walls of said inner vessel.

4. An apparatus according to claim 2, wherein said apparatus is configured to be deployed upstream of device selected from a group consisting of: a subsea multiphase pump, a subsea compressor, a subsea flow meter, and a centrifugal separator.

5. An apparatus according to claim 1, wherein a lower annulus is formed between an outer lower portion of the inner vessel and an inner lower portion of the outer vessel, and wherein actuating the inner vessel in the vertical direction alters the size of the lower annulus, thereby altering an operating envelope of the apparatus.

6. An apparatus according to claim 1, wherein actuating the inner vessel upward facilitates cleaning of solid debris collected in the outer vessel.

7. An apparatus according to claim 6, wherein said inner vessel is configured for removal of solid debris that can be flushed out using an external fluid source.

8. An apparatus according to claim 6, wherein said inner vessel is configured to move upward so as to allow flushing of solid debris from the outer vessel directly through the lower outlet of the outer vessel without passing through the inner vessel.

9. An apparatus according to claim 1, wherein said apparatus is positioned downstream of a multiphase pump outlet and said apparatus further comprises a liquid-rich outlet from said outer vessel configured to draw liquid-rich flow from the multiphase fluid and to recirculate the liquid rich flow back into said multiphase pump.

10. An apparatus according to claim 9, wherein a lower annulus is formed between an outer lower portion of the inner vessel and an inner lower portion of the outer vessel, and wherein actuating the inner vessel in a downward direction reduces the size of the lower annulus, thereby increasing ability to draw liquid-rich fluid from said liquid-rich outlet.

11. A method of conditioning a multiphase fluid comprising a gaseous phase and a liquid phase, the method comprising:

introducing said multiphase fluid from a source into an upper inlet of an outer vessel;

flowing at least a portion of the multiphase fluid into an actuatable inner vessel disposed within the outer vessel through one or more upper openings at an upper location of the inner vessel;

flowing at least a portion of the multiphase fluid through the inner vessel, outward through a lower opening of the inner vessel and outward through a lower outlet of the outer vessel;

flowing a second portion of the multiphase fluid from said outer vessel through a lower annulus formed between an outer lower portion of the inner vessel and an inner lower portion of the outer vessel, and outward through said lower outlet of the outer vessel, thereby bypassing said inner vessel, wherein fluid passing out of the lower outlet of the outer vessel is conditioned;

removing said inner vessel from said outer vessel; and flushing accumulated solid debris from said outer vessel using an external fluid source.

12. A method according to claim 11, further comprising actuating the inner vessel in a vertical direction with respect to the outer vessel, thereby altering a size of the lower annulus.

13. A method according to claim 12, wherein said conditioning comprises mixing said gaseous phase and liquid phase such that the conditioned multiphase fluid is in a homogenized state.

14. A method according to claim 12, wherein actuating the inner vessel is in an upward direction so as to enlarge the lower annulus, said method further comprising moving solid debris collected in the outer vessel outward through said annulus and outward through said lower outlet.

15. A method according to claim 13, wherein actuating the inner vessel in the vertical direction alters the size of the lower annulus, thereby altering an operating envelope of said mixing.

16. A method according to claim 11, wherein said conditioning comprises splitting said multiphase fluid into a first flow path leading toward a surface location and a second liquid-rich flow path recirculating back into an upstream pump located at a subsea location.

17. A method according to claim 16, further comprising:

actuating the inner vessel in a vertical direction with respect to the outer vessel, thereby closing the lower annulus and causing most or all of said liquid phase to recirculate back into said upstream pump;

starting flow from one or more wells that had been previously non-producing; and when said one or more wells are producing sufficient liquid phase, re-actuating the inner vessel, thereby re-opening said lower annulus.

18. A method of starting up one or more dead wells, the method comprising:

in a subsea location, pumping a multiphase fluid with a subsea multiphase pump;

introducing the pumped multiphase fluid into a flow splitter disposed downstream of said multiphase pump, said flow splitter including an upper gas-rich outlet, a lower liquid-rich outlet and a main outlet;

closing a first valve, thereby shutting off the main outlet of said splitter;

opening a second valve, thereby allowing gas-rich fluid from said upper gas-rich outlet of the splitter to flow out toward a surface location;

opening a third valve, thereby allowing liquid-rich fluid from said lower liquid-rich outlet of the splitter to flow back into said multiphase pump; and after some liquid phase is being drawn from one or more previously non-producing wells into said multiphase pump, opening said first valve and closing said second valve.

19. An actuatable apparatus for receiving a multiphase fluid from a source thereof and for conditioning said multiphase fluid, the fluid comprising a gaseous phase and a liquid phase, the apparatus comprising:

an outer vessel configured to condition the multiphase fluid;

an upper inlet configured to receive the multiphase fluid from the source and introduce said multiphase fluid at an upper location into the outer vessel;

an actuatable inner vessel disposed within the outer vessel, the inner vessel comprising:

one or more upper openings at an upper location of the inner vessel such that multiphase fluid can pass from the outer vessel into the inner vessel; and a plurality of perforations along a side wall of said inner vessel, wherein each perforation is disposed below the one or more openings;

wherein the inner vessel having a lower opening at a lower location of the inner vessel such that multiphase fluid can pass out of the inner vessel, the inner vessel being configured to be actuatable such that the inner vessel moves in a vertical direction with respect to the outer vessel;

a lower outlet configured to discharge the conditioned multiphase fluid from the outer vessel, the lower outlet in fluid communication with the lower opening of the inner vessel such that multiphase fluid passing out of the inner vessel is discharged from the outer vessel; and a sleeve disposed within the outer vessel that receives at least a portion of the actuatable inner vessel therein, wherein the one or more upper openings are disposed within the sleeve.

* * * * *